(12) United States Patent
Oh et al.

(10) Patent No.: US 8,355,713 B1
(45) Date of Patent: Jan. 15, 2013

(54) USE OF FEMTOCELL TO CONTROL WIRELESS COMMUNICATION DEVICE PRIORITIES

(75) Inventors: Dae-Sik Oh, Overland Park, KS (US); Michael C. DeLaet, Belton, MO (US); Robert C. Pippert, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 369 days.

(21) Appl. No.: 12/691,563

(22) Filed: Jan. 21, 2010

(51) Int. Cl.
*H04M 3/00* (2006.01)
(52) U.S. Cl. .................................................. 455/420
(58) Field of Classification Search ................ 455/435.3
See application file for complete search history.

(56) References Cited

U.S. PATENT DOCUMENTS

| | | | |
|---|---|---|---|
| 2003/0071117 A1 | 4/2003 | Meade, II | |
| 2003/0214931 A1* | 11/2003 | Nakayasu | 370/342 |
| 2006/0056420 A1* | 3/2006 | Okuda et al. | 370/395.54 |
| 2009/0196269 A1* | 8/2009 | Agarwal et al. | 370/341 |
| 2009/0258644 A1* | 10/2009 | Osborn | 455/432.1 |

OTHER PUBLICATIONS

Digital Living Network Alliance—http://en.wikipedia.org/wiki/Digital_Living_Network_Alliance—(from Wikipedia, the free encyclopedia, printed on Nov. 2, 2009).
Donegan, Michelle; "Femtocells Kick Apps," Jun. 24, 2009. http://www.unstrung.com/document.asp?doc_id=178423&.

* cited by examiner

*Primary Examiner* — Steven Lim

(57) ABSTRACT

Methods and systems are provided for determining relative priorities of wireless communication devices with respect to controlling controllable devices. A femtocell receiving a registration request and a device identifier from a first wireless communication device may responsively (i) provide the first wireless communication device with wireless service and (ii) use the device identifier to determine at least one respective relative priority of the first wireless communication device compared to a second wireless communication device with respect to controlling at least one controllable device. The femtocell may then transmit at least one message to at least one of (i) the first wireless communication device, (ii) the second wireless communication device, and (iii) at least one controllable device in accordance with the determination, the at least one message reflecting the determined at least one relative priority. In this way, conflicts between multiple controlling devices may be avoided.

22 Claims, 4 Drawing Sheets

USE OF FEMTOCELL TO CONTROL WIRELESS COMMUNICATION DEVICE PRIORITIES

BACKGROUND

1. Cellular Wireless Networks

Many people use wireless communication devices (WCDs), such as cell phones and personal digital assistants (PDAs), to communicate with cellular wireless networks. Service providers that operate these wireless networks typically distribute WCDs to their subscribers, perhaps by selling the WCDs at retail outlets or over the Internet, or perhaps by offering WCDs at no cost to people that subscribe to a particular service plan. Service providers then typically assign each WCD a telephone directory number—often known as a mobile identification number (MIN) or mobile directory number (MDN)—under which a WCD may operate. Via a manual or over-the-air provisioning process, the service provider will cause the WCD to store its MIN in its Number Assignment Module (NAM). Furthermore, a WCD typically is provided at the time of manufacture with an electronic serial number (ESN), which identifies the WCD as a unique physical device.

These WCDs and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1×RTT networks" (or "1× networks" for short), which stands for "Single Carrier Radio Transmission Technology." Another protocol that may be used is known as Evolution Data Optimized (EV-DO), perhaps in conformance with one or more industry specifications such as IS-856. Other protocols may be used as well, such as Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors. When a WCD is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket large geographic areas with coverage; as such, they are referred to generally and herein as "macro (or macro-network) base stations" and the network they collectively form—or to which they collectively belong—is referred to generally and herein as the "macro network."

WCDs and macro base stations conduct communication sessions (e.g., voice calls and data sessions) over frequencies known as carriers, each of which may actually be a pair of frequencies, with the base station transmitting to the WCD on one of the frequencies, and the WCD transmitting to the base station on the other. This is known as frequency division duplex (FDD). The base-station-to-WCD link is known as the forward link, while the WCD-to-base-station link is known as the reverse link.

WCDs are programmed to use a pre-determined algorithm to select one of the carriers to use in communications with a base station. When a WCD is not engaged in an active communication session, the WCD does what is known as idling on the selected carrier, which means among other things that the WCD is tuned to that carrier for receiving page messages, SMS messages, and other similar messages, and that the WCD will also send access requests for call origination and other purposes to the base station on that carrier.

2. Femtocells

Many macro-network subscribers, including private consumers and businesses, among others, in addition to having wireless service (which may include data service) for their WCD (or WCDs), also have high-speed (a.k.a. "broadband") Internet access through another communication channel. This other channel may be cable-modem service, digital-subscriber-line (DSL) service, satellite-based Internet service, T1 service, and/or some other option.

In an exemplary arrangement, a user may have a cable modem connected (a) via coaxial cable to a cable provider's network and (b) via Ethernet cable to a local-area wired and/or wireless network (e.g., IEEE 802.11 WiFi-enabled router). The router may include one or more Ethernet ports to which additional computers or other devices may also be connected, and may include wireless-access-point functionality, providing a WiFi packet-data interface to, for example, laptop computers, digital video recorders (DVRs), appliances, and/or any other computing devices or wireless network adapters.

To address gaps in macro-network coverage (e.g., in buildings and homes) and for other reasons, macro-network service providers have recently begun offering their clients devices referred to herein as femtocells.

A typical femtocell may be approximately the size of a desktop phone or WiFi access point, and is functionally a low-power, low-capacity version of a macro base station. Thus, a typical femtocell will use a normal power outlet, perhaps with a transformer providing a DC power supply. The femtocell may have a wired (e.g., Ethernet) or wireless (e.g., WiFi) connection with the user's router and/or cable modem, and would thus have connectivity to the Internet and/or one or more other packet-data networks via the user's broadband connection. The femtocell may then also have access to the devices connected to the user's router through the router's Ethernet and/or WiFi interfaces.

A femtocell may establish a virtual-private-network (VPN) connection over the Internet with an entity (e.g., a VPN terminator) on the wireless-service (macro-network) provider's core network, and thereby be able to securely communicate with the VPN terminator and other entities on that core network and beyond. The femtocell may thus provide additional functionality to WCDs it serves via access to the core network.

The femtocell also has a wireless-communication (e.g., CDMA) interface that is compatible with the user's WCD(s), such that the femtocell may act as a micro base station, providing local wireless coverage on the wireless-service provider's network via the user's Internet connection. Usually, a femtocell will provide service on a single RF carrier (or on a single carrier per technology, where multiple technologies (such as CDMA and EV-DO) are supported), and also transmit what is known as a pilot beacon, which includes administrative messages and parameters that WCDs can use to connect with the femtocell. The single RF carrier that the femtocell uses to provide service is typically different from those used by the macro network.

Femtocells may also include a Global Positioning System (GPS) receiver for receiving and decoding GPS signals for use in determination of location, as well as for use in synchronizing operations with other femtocells and with the macro network based on timing information embedded in the GPS signals.

OVERVIEW

As WCDs have become more powerful, they have been provided with an ever-increasing amount of additional functionality to take advantage of the increased processing power and the WCD's inherent portability. For example, WCDs may be used to control various electronic controllable devices, such as televisions, digital video recorders (DVRs), cable boxes, radios, home-theater receivers, projectors, computers, and other electronic devices. The enactment of the Digital Living Network Alliance (DLNA) standard, which is a standard used by manufacturers of consumer electronics to allow entertainment devices within the home to share their content with each other across a home network, may increase the use of WCDs to control the various controllable devices. For example, a WCD and television both conforming with the DLNA standard (or some other protocol) may interact with one another, allowing the WCD to send pictures to the television and to control the display of the pictures on the television, as well as perhaps acting as a remote control for the television and/or associated electronic devices. Other combinations of devices and other activities are possible as well.

However, a problem may arise when multiple WCDs within the vicinity of a controllable device attempt to exert control over the same controllable device at substantially the same time. For example, a user of a first WCD may take action to begin sending and displaying pictures on a television at a same or substantially same time as a user of a second WCD takes action to begin sending and displaying video on the same television. It would be useful if there were a consistent way to determine WCD priority on a controllable-device basis to avoid such conflicts.

It would thus be advantageous to provide for a mechanism wherein relative priorities of WCDs could be set in advance, so as to prevent conflicts and allow only the WCD with the higher (or highest) priority for that controllable device to exert control over the respective controllable device. The existence of a femtocell device that is connectable to local WCDs and/or local controllable devices provides a convenient vehicle to implement WCD prioritization with respect to the controllable devices.

Methods and systems are provided herein for using a WCD's femtocell registration to trigger and enable a prioritization process for prioritizing the control of controllable devices. More specifically, responsive to detecting a registration of a user's WCD, a femtocell may (i) automatically provide service to the user's WCD and (ii) use a device identifier associated with the user's WCD to determine at least one respective relative priority of the user's WCD compared to a second WCD with respect to controlling at least one controllable device. The first WCD may be, for example, owned and operated by one family member of a household, while the second WCD may be owned and operated by a second family member of the household. The respective first and second family members could be mother and son, for example. Other combinations are also possible. In the corporate environment, the first WCD may be owned and operated by a product engineer, while the second WCD may be owned and operated by a chief technical officer (CTO). And numerous other examples are clearly possible.

The WCD may be any electronic device capable of communicating with a femtocell and optionally with one or more controllable devices. The WCD may be or include a cell phone, a PDA, a computer, a laptop computer, a hybrid CDMA/EV-DO device, and/or a multi-mode cellular/Wi-Fi device. Other devices are possible as well.

The device identifier received from the WCD may be an electronic serial number (ESN) and/or a mobile identification number (MIN), among other possibilities. The determination of a respective relative priority may be based on the received device identifier or some other identifier that is obtained using the received device identifier. The identifier may then be used by the femtocell to access a data store that sets forth relative priorities of WCDs. The data store may include, for example, a priority record for each controllable device and may set forth a hierarchical list of WCDs for each controllable device arranged according to their respective priority. The data store may be stored at the femtocell in a volatile or non-volatile electronic storage device such as a hard disk, random access memory, or flash memory. Other electronic storage devices could also be used.

Of course, the data store need not be located at the femtocell, but may be located at any network location that is accessible to the femtocell, including a local area network, a remote location on the Internet, or at a node in the wireless service provider's network. Other locations are also possible. In the event that the data store is located remote from the femtocell, the femtocell may use a messaging or file transfer system to access the relative priority data.

Upon detecting the registration of a previously un-registered WCD (a "new WCD"), the femtocell may provide the new WCD with wireless service and access the relative priority data in the local or remote data store, and for each controllable device, determine if the new WCD has a higher priority level than already-registered WCDs. The femtocell may make this determination for each controllable device in the data store by, for example, referencing whether a device identifier associated with the new WCD has a higher priority than a highest-priority already-registered WCD with respect to each controllable device.

If the femtocell determines that the new WCD does not take priority over any already-registered WCDs for each of one or more controllable devices, the femtocell may take no further action. Alternatively, the femtocell may notify the new WCD of the existence of the higher-priority already-registered WCDs, so that the new WCD may perhaps make a corresponding notification to a user via a graphical user interface.

If, on the other hand, the femtocell determines that the new WCD does take priority over a highest-priority already-registered WCD for a particular controllable device, the WCD may then proceed to notify one or more of the new WCD, the highest-priority already-registered WCD, and the particular controllable device, of the determination.

In one embodiment, the femtocell may transmit a message to the new WCD, the message reflecting that the new WCD is now the highest-priority controlling device with respect to the particular controllable device. The new WCD may then be configured, responsive to receiving the notification, to allow a user to control the particular controllable device. The new WCD may control the particular controllable device by sending commands directly to the controllable device, via a short-range wireless connection, such as infrared or Bluetooth. Or the new WCD may send commands to the femtocell, which may in turn forward the commands to the controllable device via a wired or wireless connection. And other arrangements are certainly possible as well.

In order to avoid allowing the previous highest-priority already-registered WCD to continue controlling the particular controllable device, the femtocell may transmit a second message to the previous already-registered WCD revoking its status as the highest-priority controlling device with respect to the particular controllable device. The previous already-registered WCD may provide an indication of the revocation to a user via a graphical user interface.

Alternatively, the already-registered WCD may be configured to automatically revoke its own status as the highest-priority controlling device once a pre-determined amount of time has passed without receiving an updated indication of its status from the femtocell. Such an updated indication might set forth that the already-registered WCD remains the highest-priority controlling device with respect to the particular controllable device. In this manner, a separate second message would not necessarily need to be transmitted from the femtocell to the already-registered WCD to revoke its status. Instead, after the predetermined amount of time has passed, the already-registered WCD would automatically revoke its status and prevent a user from controlling the particular controllable device, or perhaps assume a lower-priority status.

In another embodiment, instead of or in addition to sending a message to a WCD, the femtocell may transmit a message to the particular controllable device, notifying the controllable device that the new WCD is now the highest-priority controlling device. The message to the controllable device may include a device identifier that allows the particular controllable device to identify signals sent directly from the new WCD. For example, the new WCD may be configured to communicate with the particular controllable device directly via a short-range wireless transmission over a short-range wireless connection. In order for the controllable device to recognize the new WCD as the highest-priority device, the particular controllable device may compare the device identifier received from the femtocell with the device identifier received directly from the new WCD.

If the device identifiers match, the particular controllable device would execute the command(s) sent from the new WCD. If the device identifiers do not match, the particular controllable device may simply ignore the commands, or may provide an indication to the new WCD that it is not currently the highest-priority controlling device. The indication may be provided directly to the new WCD via the same short-range wireless connection. Furthermore, the particular controllable device may apply the priority determination for all the commands that it supports, or may apply the priority determination on a command-by-command basis such that some WCDs may have priority for some functions, while other WCDs may have priority for other functions, or such that some commands are executed by the controllable device regardless of priority.

In a further embodiment, the data store may include priority data for a plurality of different controllable devices. The determining step would then require the femtocell to make a plurality of separate priority determinations for each of the plurality of different controllable devices. For example, it is possible that the data store maintains priority data for both a kitchen TV and a living-room TV. The femtocell may then determine that the new WCD is now the highest-priority controlling device with respect to the kitchen TV, but not the living-room TV. In this instance, the femtocell may transmit a notification message to the new WCD that it is now the highest-priority controlling device with respect to the kitchen TV, so as to allow the new WCD to control the kitchen TV.

Alternatively, the femtocell may transmit a notification message to the kitchen TV notifying the kitchen TV that the new WCD is now its highest-priority controlling device. Other possibilities exist as well.

In another embodiment, the femtocell may transmit a message to a particular controllable device notifying the controllable device of a hierarchy of WCD priorities. For example, if two already-registered WCDs A and B are capable of controlling particular controllable device C, and a newly-registered WCD Z has a priority in between that of A and B, the femtocell may transmit a message to the controllable device C including the ordered priority list of WCDs as "A,Z,B." The message may also include corresponding device identifiers for each WCD so that the controllable device C can identify communications for each corresponding WCD. The controllable device C may then use the list of priorities in any way it sees fit. For example, the controllable device C may be configured to allow certain commands, such as volume, to be operated by all users (A, Z, and B) regardless of priority, but other commands, such as channel, to be operated by only the highest-priority WCD (or highest 2 WCDs), for example. Another possibility includes the controllable device C allowing WCD A to change the channel to an age-restricted channel, while preventing WCD Z from changing the channel to an age-restricted channel. The information regarding which channels are accessible by which devices may be stored in the controllable device C itself, or may be stored in the same data store that the priority data is stored in, for example.

In accordance with the foregoing embodiments, priorities among multiple WCDs each capable of controlling one or more controllable devices may be seamlessly managed by a femtocell. As a result of the disclosed methods and apparatus, conflicts among multiple controlling WCDs may be avoided by prioritizing WCDs relative to respective controllable devices. These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION

1. Exemplary Architecture

Figure 1:
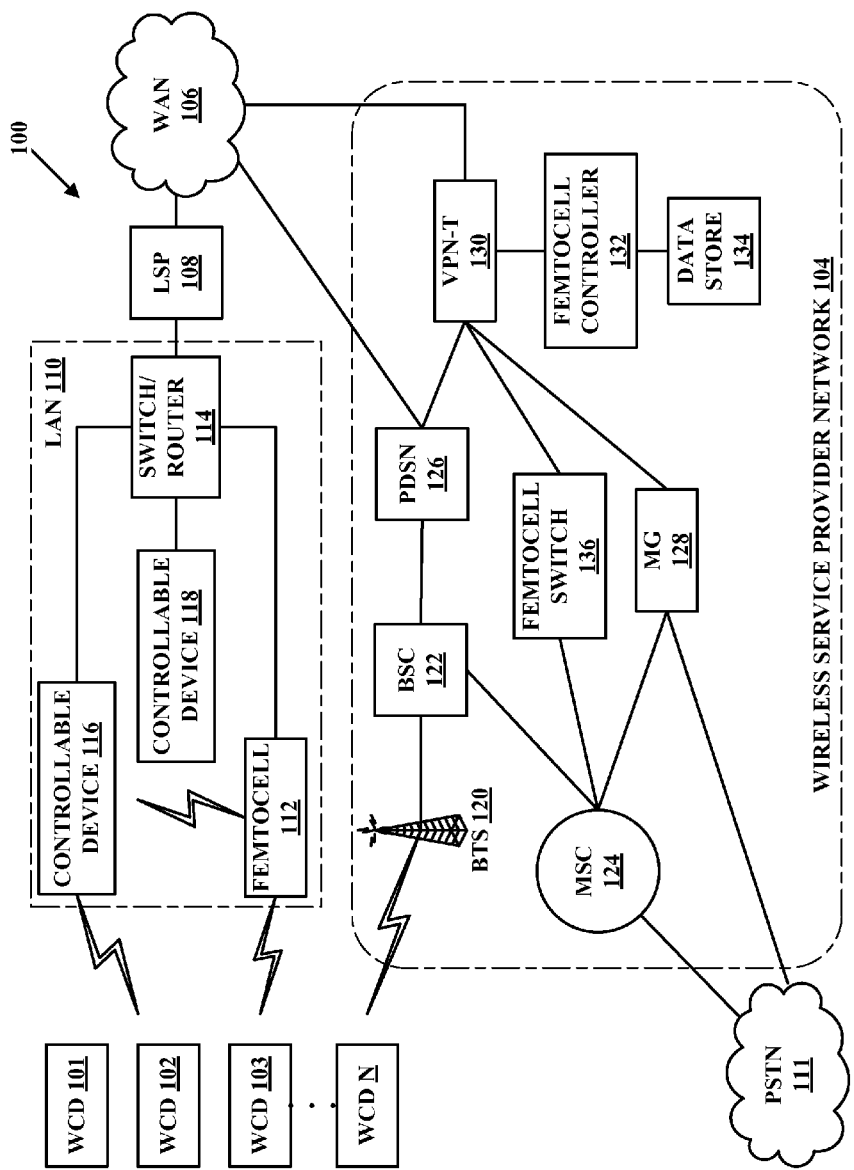
FIG. 1 is a simplified block diagram of a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes: at least first, second, and third wireless communication devices (WCDs) 101, 102, and 103 but potentially including up to "N" WCDs (where N is, for example, less than or equal to 50), a wireless service provider network (WSPN) 104, a Wide Area Network (WAN) 106, a local service provider (LSP) 108, a local area network (LAN) 110, and a public switched telephone network (PSTN) 111. The LAN 110 may include a femtocell 112, a switch/router device 114, a first controllable device 116, and a second controllable device 118. The WSPN 104 includes a macro base transceiver station (BTS) 120, a base station controller (BSC) 122, a mobile switching center (MSC) 124, a packet data serving node (PDSN) 126, a media gateway (MG) 128, a VPN terminator (VPN-T) 130, a femtocell controller 132, a data store 134, and a femtocell switch 136. Additional entities could be present without departing from the spirit of the invention, such as additional mobile stations in communication with BTS 120, additional entities in communication with WAN 106 and/or PSTN 111, etc. Also, there could be one or more devices and/or networks making up at least part of one or more communication links.

Figure 2:
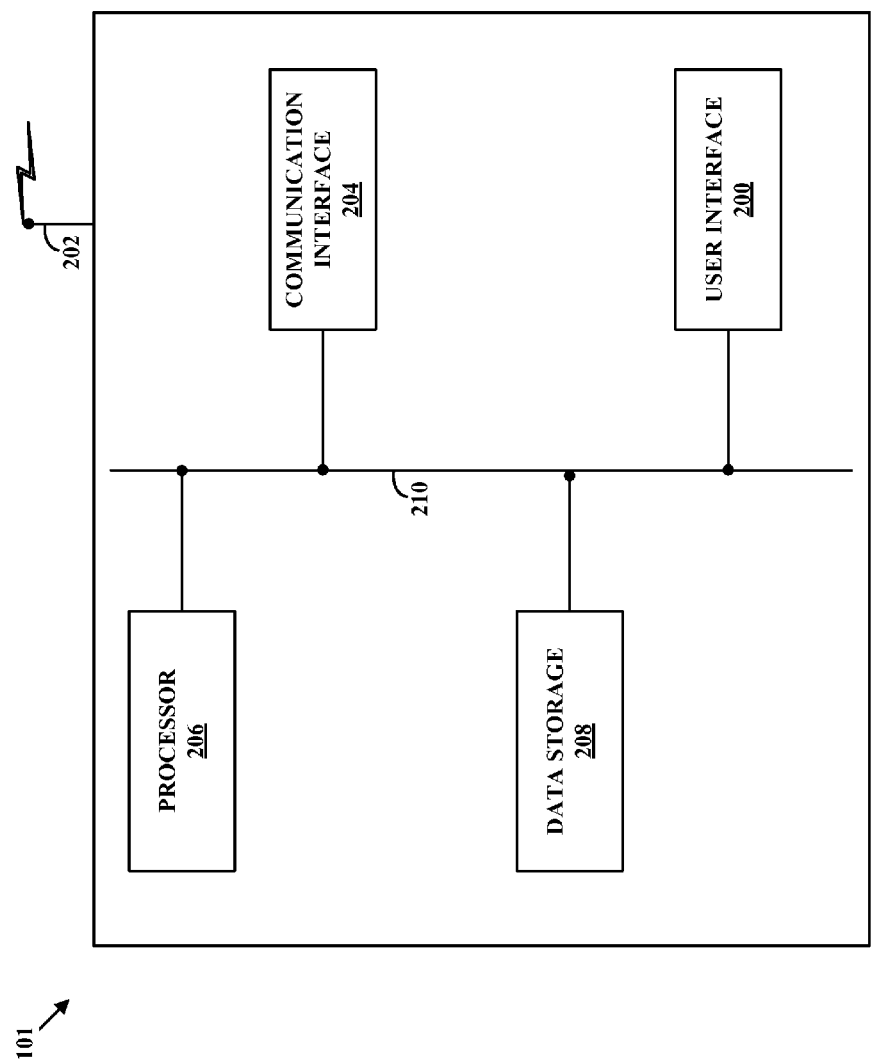
FIG. 2 is a simplified block diagram of a wireless communication device, in accordance with exemplary embodiments.

WCDs 101-103 may be any mobile device arranged to carry out the WCD functions described herein. WCD 101 may be the same or different than WCD 102 and/or WCD 103. While WCD 101 will be used to describe WCD features in general, it should be understood that any of the forthcoming features described relative to WCD 101 are equally applicable to WCDs 102 and 103. FIG. 2 is a simplified block diagram of a WCD 101, in accordance with an exemplary embodiment. As shown, WCD 101 may include a user interface 200, a wireless-communication interface 202/204, a processor 206, and data storage 208 comprising instructions executable by the processor 206 for carrying out WCD functions. The user interface 200 may include buttons, a touchscreen, a microphone, and/or any other elements for receiving inputs, as well as a speaker, one or more displays, and/or any other elements for communicating outputs.

The wireless-communication interface 202/204 of the WCD 101 may include an antenna 202 and a chipset 204 suitable for communicating with one or more macro base stations 108 and/or one or more femtocells 106 and/or one or more controllable devices 116/118 over suitable air interfaces. For example, the chipset 204 could be suitable for CDMA communication. The chipset 204 or wireless-communication interface 202/204 in general may also, or instead, be able to communicate with other types of networks and devices, such as EV-DO networks, WiFi networks, Infrared devices, Bluetooth devices, and/or one or more additional types of networks and devices.

The processor 206 and data storage 208 may be any suitable components known to those of skill in the art. As examples, WCD 101 could be or include a cell phone, a PDA, a computer, a laptop computer, a hybrid CDMA/EV-DO device, and/or a multi-mode cellular/WiFi device.

Returning to FIG. 1, WSPN 104 may encompass all or some of the network elements depicted in FIG. 1 as being included in its dashed-rectangle shape. In general, there may be more and/or different communication links among entities within WSPN 104 than those set forth in FIG. 1, and there may be more and/or different connections between WSPN 104 and outside entities. Furthermore, there may be a core packet network (not depicted) making up part of WSPN 104, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

WAN 106 may be the well-known global packet-data network generally referred to as the Internet. However, WAN 106 may also be or include one or more other packet-data networks, without departing from the scope and spirit of the present invention. As such, WAN 106 may include one or more other wide area networks, one or more local area networks, one or more public networks, one or more private networks, one or more wired networks, one or more wireless networks, and/or one or more networks of any other type. Devices in communication with WAN 106 may exchange data using a packet-switched protocol such as the Internet Protocol (IP), and may be uniquely identified by an address such as an IP address.

LSP 108 may be any local service provider network that provides local packet-switched communications services to end-user residential or business customers and provides the end-user customers with access to the WAN 106. The LSP 108 may provide services to the end-user customers via data over cable service interface specification (DOCSIS), digital subscriber line (DSL), T-carrier, WiMAX, CDMA, or any other now-existing or future access technologies. The LSP 108 may, for example, provide the end-user customer (for example, a user associated with LAN 110) with the necessary electrical medium connection from the premises of the LAN 110 to the LSP's own network, and may provide the LAN 110 with one or more IP addresses that may be used to send data across the LSP's network 108 and ultimately to the WAN 106. The LSP's network 108 may comprise one or more switches, routers, dynamic host configuration protocol (DHCP) servers, firewalls, and/or other devices that operate to connect end-user customers to the WAN 106.

Figure 3:
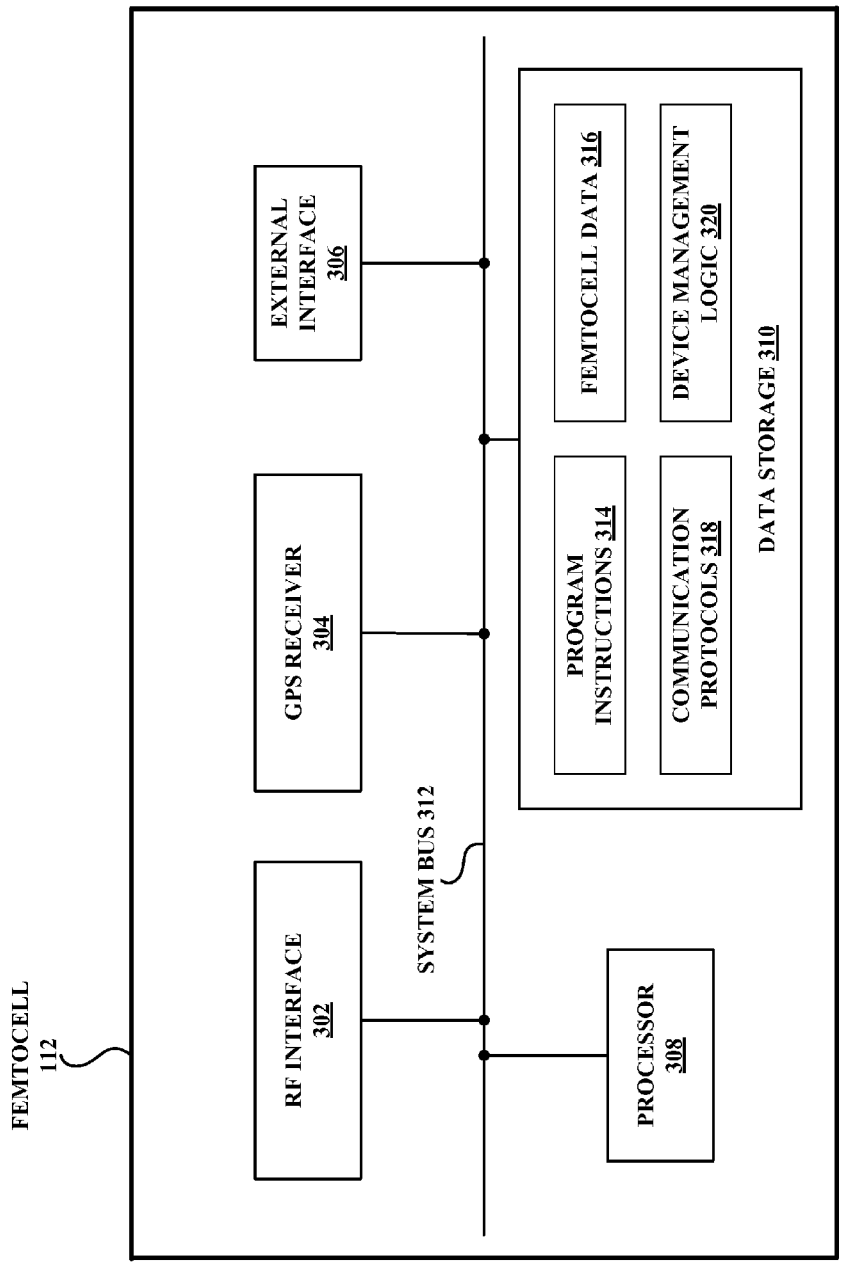
FIG. 3 is a simplified block diagram of a femtocell, in accordance with exemplary embodiments.

Femtocell 112 may be any computing and communication device arranged to carry out femtocell functions. As such, femtocell 112 may include a communication interface, a processor, and data storage comprising instructions executable by the processor for carrying out the femtocell functions described herein. FIG. 3 depicts an exemplary diagram of femtocell 112, which includes an RF interface 302, a GPS receiver 304, an external interface 306, a processor 308, and data storage 310, all communicatively linked by a system bus 312. Note that femtocell 112 could have additional and/or different components than those set forth in FIG. 3, and that this structure is provided by way of example only.

RF interface 302 may include one or more antennas, one or more chipsets, a set of one or more channel elements, and/or one or more other components suitable for providing a wireless coverage area according to a wireless-communication protocol such as CDMA (and/or one or more other wireless technologies). The same RF interface 302, or a different RF interface, may also provide a wireless connection between the femtocell 112 and the first and second controllable devices 116 and 118. GPS receiver 304 may be any known or hereafter-developed GPS receiver, suitable for receiving and decoding GPS signals for location and timing purposes, perhaps among other purposes. In some embodiments, a femtocell may have a location module in addition to or instead of a GPS receiver.

External interface 306 may provide a wired and/or wireless packet-data interface for communicating with a device such as a switch/router 114. The same external interface 306, or a different external interface, may also provide a wired or wireless connection between the femtocell 112 and the first and second controllable devices 116 and 118. Processor 308 may comprise multiple (e.g., parallel) processors, such as a general purpose microprocessor and/or a discrete digital signal processor. The data storage 310 may take various forms, in one or more parts, such as a non-volatile storage block and/or a removable storage medium, and may include (a) program instructions 314 executable by processor 308 for carrying out the femtocell functions described herein, (b) femtocell data 316, which may be any operational data or other type of data stored for use by femtocell 112, (c) communication protocols 318, facilitating and enabling communication with one or more other devices, and (d) device management logic 320, perhaps for memory and file management.

Returning to FIG. 1, switch/router device 114 may be any computing and communication device arranged to connect the LAN 110 to the LSP's network 108 and to connect devices within the LAN 110, such as controllable devices 116, 118 and femtocell 112. The switch/router device 114 may include a communication interface, a processor, and data storage comprising instructions executable by the processor for carrying out at least the connecting function. The communication interface may include one or more wired and/or wireless interfaces for communicating with the devices within the LAN 110 and with the LSP 108. In general, the router/switch device 114 functions to support transmission of data between controllable device 116 and controllable device 118, between controllable device 116 and femtocell 112, between controllable device 118 and femtocell 112, and between LAN 110 and other external networks.

The switch/router device 114 may connect one network (LAN 110) with another, generally upstream, network (the LSP's network 108 and ultimately the WAN 106). The switch/router device 114 may also convert between those protocols supported by the LAN 110 and those supported on the link between the gateway device 114 and the LSP 108 (including modulation and demodulation functions). Switch/router device 114 may thus provide the functions of, for example, a cable modem or DSL modem with gateway features. Alternatively, the switch/router device 114 may act as a bridging device that simply bridges the LAN 110 to the LSP's network 108. Of course, the functions of switch/router 114 could be provided by two or more separate interconnected devices, and do not need to be embodied in a single device.

Controllable devices 116, 118 may be any electronic device controllable by the WCDs 101-103 via (i) a direct connection between the WCDs and the controllable device 116 or (ii) an indirect connection through the femtocell 112. Although only two controllable devices 116, 118 are illustrated in FIG. 1, additional controllable devices could also be present in the LAN 110. As one example, up to 50 controllable devices may be present in the LAN 110. Controllable devices 116, 118 may each include a communication interface, a processor, and data storage comprising instructions executable by the processor for carrying out the various functions described herein. The communication interface may include one or more wired and/or wireless interfaces for communicating with WCDs 101-103, femtocell 112 directly via a wired or wireless connection, or femtocell 112 indirectly through the switch/router 114 via a wired or wireless connection with the switch/router 114. For example, the communication interface may support a direct wireless connection with the WCDs 101-103 via an infrared or Bluetooth wireless connection, and may also support a direct wireless connection with the femtocell 112 via an IEEE 802.11 connection.

Instructions included in the data storage may include instructions for receiving control commands from WCDs 101-103 via a direct communication or via an indirect communication through femtocell 112, and for executing the received control commands without any consideration of WCD priority. Alternatively or additionally, the data store may include instructions for receiving a WCD priority list and executing only those control commands received from WCDs 101-103 (or from femtocell 112) having a device identifier that matches a corresponding device identifier in the priority list. The priority list may include, for example, only the highest priority WCD or may include a hierarchical list of WCDs.

Macro BTS 120 may be any network element arranged to carry out macro-BTS functions. As such, macro BTS 120 may include a communication interface, a processor, and data storage comprising instructions executable by the processor to carry out the macro-BTS functions. The communication interface may include one or more antennas, chipsets, and/or other components for providing one or more CDMA (and/or any other protocol(s)) coverage areas such as cells and sectors, for communicating with WCDs such as WCD 101 over an air interface. The communication interface may also include one or more wired (e.g. Ethernet) and/or wireless (e.g. WiFi) interfaces for communicating with at least BSC 122.

BSC 122 may be any network element arranged to carry out BSC functions. As such, BSC 122 may include a communication interface, a processor, and data storage comprising instructions executable by the processor to carry out BSC functions. The communication interface may include one or more wired and/or wireless interfaces for communicating with at least macro BTS 120, MSC 124, femtocell switch 136, and PDSN 126. In general, BSC 122 functions to control one or more macro BTSs such as macro BTS 120, and to provide those one or more macro BTSs with connections to devices such as MSC 124, femtocell switch 136, and/or PDSN 126.

Note that the combination of macro BTS 120 and BSC 122 may be considered a macro base station. However, macro BTS 120 or BSC 122 could, taken alone, be considered a macro base station as well. Furthermore, a macro base station may be considered to be either or both of those devices, and perhaps make use of one or more functions provided by MSC 124, PDSN 126, femtocell switch 136, and/or any other entity, without departing from the invention. And it should be noted that the macro network and/or the femtocell(s) described herein may operate according to CDMA, EV-DO, iDEN, TDMA, AMPS, GSM, GPRS, UMTS, EDGE, WiMAX (e.g., IEEE 802.16), LTE, microwave, satellite, MMDS, WiFi (e.g., IEEE 802.11), Bluetooth, infrared, and/or any other wireless technology or technologies now known or later developed.

MSC 124 may be any networking element arranged to carry out MSC functions. Thus, MSC 124 may include a communication interface, a processor, and data storage comprising instructions executable by the processor to carry out MSC functions. The communication interface may include one or more wired and/or wireless interfaces for communicating with at least BSC 122, femtocell switch 136, and PSTN 111. In general, MSC 124 acts as a switch between (a) PSTN 111 and one or more BSCs such as BSC 122 and/or (b) between PSTN 111 and one or more femtocells 112 via femtocell switch 136, facilitating communication between WCDs 101-103 and PSTN 111.

PDSN 126 may be any networking element arranged to carry out PDSN functions. As such, PDSN 126 may include a communication interface, a processor, and data storage comprising instructions executable by the processor for carrying out PDSN functions. The communication interface may include one or more wired and/or wireless interfaces for communicating with at least BSC 122, WAN 106, and VPN terminator 130. In general, PDSN 126 acts as a network access server between WAN 106 and BSCs such as BSC 122, facilitating packet-data communication between WCDs 101-103 and WAN 106 via macro base stations 120.

MG 128 may be any networking element arranged to carry out media-gateway functions. As such, MG 128 may include a communication interface, a processor, and data storage comprising instructions executable by the processor for carrying out media-gateway functions. The communication interface may include a circuit-switched interface and a packet-switched interface. MG 128 may (a) receive packet-based communications from within the WSPN 104, convert those to circuit-switched communications, and pass them to PSTN 111 and (b) receive circuit-switched communications from PSTN 111, convert those to packet-based communications, and pass them to another device within WSPN 104.

VPN terminator 130 may be any networking element arranged to carry out VPN-terminator functions. Thus, VPN terminator 130 may include a communication interface, a processor, and data storage comprising instructions executable by the processor for carrying out VPN-terminator functions. The communication interface may include one or more wired and/or wireless interfaces for communicating with at least femtocell controller 132, PDSN 126, femtocell switch 136, MG 128, and WAN 106. In general, VPN terminator 130 functions to establish secure VPN connections over WAN 106 with femtocells such as femtocell 112, enabling the femtocells to securely communicate with devices on the WSPN 104, such as femtocell controller 132, and perhaps beyond.

Femtocell controller 132 may be any networking element arranged to carry out femtocell-controller functions. Thus, femtocell controller 132 may include a communication interface, a processor, and data storage comprising instructions executable by the processor for carrying out femtocell-controller functions. The communication interface may include one or more wired and/or wireless interfaces for communicating with at least VPN terminator 130, along with perhaps one or more other entities on WSPN 104, and beyond.

Among other functions, femtocell controller 132 communicates via VPN terminator 130 with femtocells such as femtocell 112. Femtocell controller 132 may receive requests from various femtocells for access to a data store 134. Femtocell controller 132 may perform the requested functions via data store 134 and transmit replies to the requesting femtocell 112. Femtocell controller 132 may also be operable to select various operational parameters for femtocells (e.g. carrier, PN offset, whether to broadcast a pilot-beacon, contents of any pilot beacon to be broadcast, transmission-power level, channel-list messages, candidate carriers for pilot-beacon broadcasts), and to transmit those parameters to femtocell, perhaps along with other configuration data and messaging.

Data store 134 may be a database of priority data associated with one or more WCDs 101-103 and/or one or more femtocells 112. The data store 134 may be disposed in the WSPN 104 remotely from the femtocell 112 and remotely from the LAN 110 on which the femtocell 112 resides. Although shown separately in FIG. 1, the data store 134 may otherwise be integrated with the femtocell controller 132. Alternatively, the data store 134 may be disposed outside the WSPN 104 and accessible via the WAN 106, or may be disposed within the LAN 110 or within the LSP's network 108. When disposed outside the WSPN 104, additional access and control logic may be provided for retrieving priority data from data store 134 in accordance with access requests from femtocells 112.

The data store 134 may organize the priority data in accordance with an identifier associated with each femtocell 112, identifiers associated with each WCD 101-103, and/or identifiers associated with controllable devices 116, 118. For example, data stored in data store 134 may be arranged in a hierarchical manner in which an identifier associated with a particular femtocell 112 is linked to identifiers associated with one or more controllable devices 116, 118, each controllable device identifier further linked to a priority list setting forth a prioritized list of WCDs that may control the particular controllable device. And other implementations are certainly possible as well.

Femtocell switch 136 may be any networking element arranged to carry out femtocell-switch functions. As such, femtocell switch 136 may include a communication interface, a processor, and data storage comprising instructions executable by the processor for carrying out femtocell-switch functions. The communication interface may include one or more wired and/or wireless interfaces for communicating with at least MSC 124 and VPN terminator 130. In general, femtocell switch 136 acts as a switch between MSC 124 and VPN terminator 130, enabling WCDs 101-103 communicating via femtocells 112 to engage in calls over PSTN 111 via MSC 124.

2. Exemplary Operation a. An Exemplary Method and Apparatus

Figure 4:
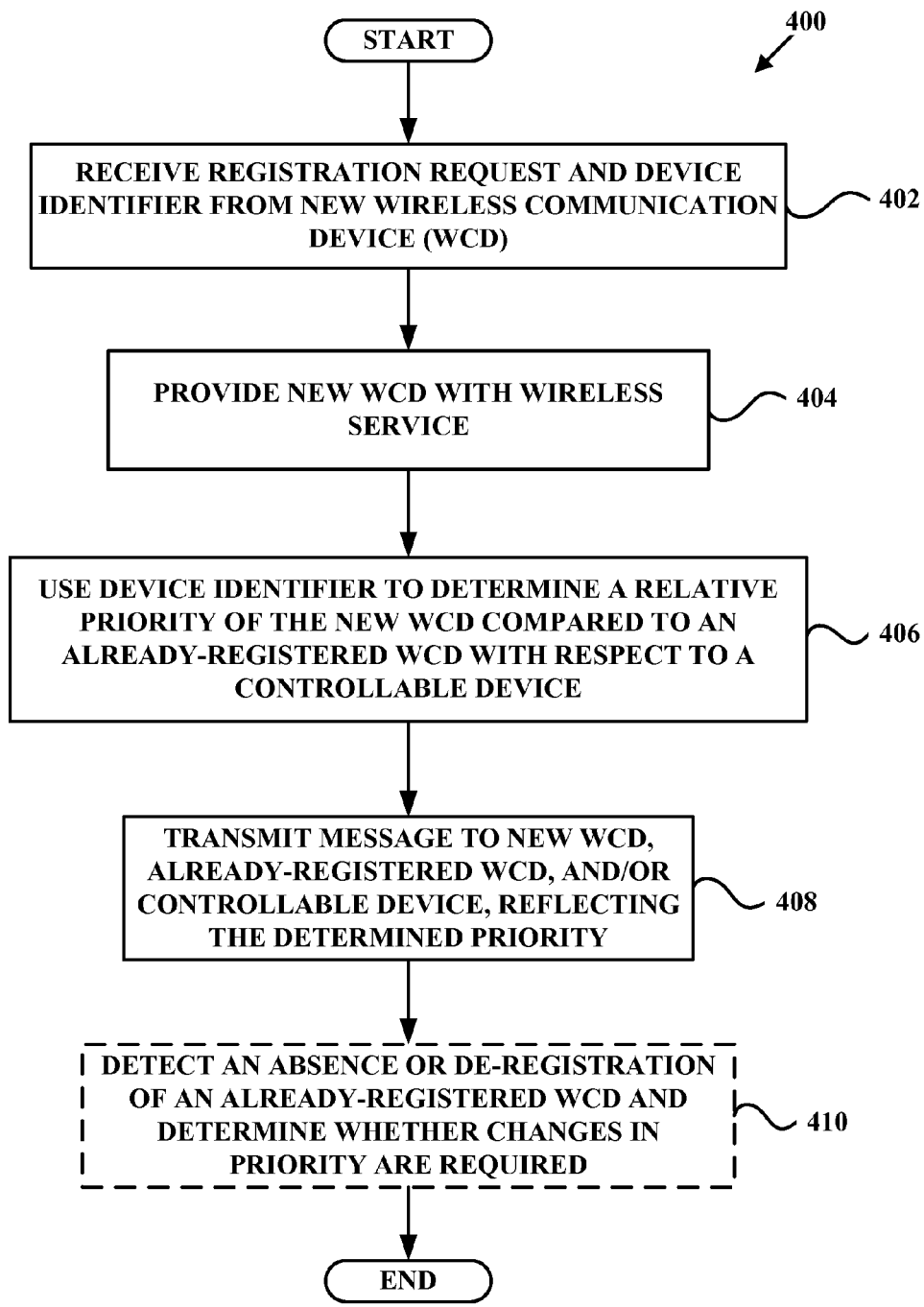
FIG. 4 is a flowchart of a method implemented by a femtocell in accordance with exemplary embodiments.

FIG. 4 depicts a flowchart of an exemplary method that may be executed by an exemplary apparatus, in accordance with an exemplary embodiment. In particular, FIG. 4 depicts a method 400 for a femtocell to use WCD registration to trigger prioritized control of controllable devices.

As shown in FIG. 4, method 400 begins at step 402, when femtocell 112 receives a registration request and device identifier from the WCD 101. At step 404, the femtocell 112 may provide the WCD 101 with wireless service. At step 406, the femtocell 112 may use the device identifier to determine a relative priority of the WCD 101 compared to a second WCD 102 and/or a third WCD 103 with respect to one or more controllable devices 116, 118. And at step 408, the femtocell 112 may transmit a message to one or more of WCDs 101-103 and/or one or more of controllable devices 116, 118 reflecting the determined priority. These steps are further described below.

i. Receive Registration Request and Device Identifier from WCD

At step 402, femtocell 112 receives a registration request and device identifier from WCD 101. The WCD 101 may transmit the registration request after initially powering on or being brought within range of the femtocell 112 and detecting a pilot beacon being broadcast by the femtocell 112. The pilot beacon may include messages and parameters that the WCD 101 may use to initially connect with the femtocell 112 or to facilitate handoff from a macro-network carrier to the femtocell's 112 carrier, among other possibilities. The messages and parameters may inform the WCD 101 of the femtocell's 112 carrier, and the WCD 101 may subsequently transmit the registration request to the femtocell 112 on the femtocell's 112 carrier.

In the registration request itself, or perhaps in a separate transmission, the WCD 101 may also provide an identifier to the femtocell 112 that uniquely identifies the WCD 101. As set forth above, the identifier may be, for example, a MIN or an ESN associated with the WCD 101. Of course, other identifiers could also be used. For example, the WCD 101 may be programmed to transmit a userID identifying a user associated with the WCD 101. Identifiers may be globally unique among all WCD's, locally unique, or may be shared among related WCDs. For example, parents in a same household may each be provided with WCDs having a non-unique identifier, and children in a same household may each be provided with WCDs having a non-unique identifier different from the parent's non-unique identifier. As a result, the parents' WCDs may have priority over the children's WCDs, but may not provide any level of priority over each other. Similarly, the children's WCDs may all be subservient to the parents' WCDs, but not provide any level of priority over each other. And other implementations are certainly possible.

ii. Provide WCD with Wireless Service

At step 404, in response to receiving the registration request from the WCD 101, the femtocell 112 may begin providing WCD 101 with wireless service on the femtocell's 112 carrier. The femtocell 112 may provide the service via a communication interface, which may be, for example, a cellular wireless communication interface compliant with the CDMA standard, or a WiFi wireless communication interface compliant with the IEEE 802.11 standard. Other wireless interfaces could also be used, instead or in addition.

The service provided to the WCD 101 may be voice service, data service, or some combination thereof. By providing the WCD 102 with access to the WSPN 104, the femtocell enables the WCD 101 to initiate voice calls via PSTN 111 and data connections via PDSN 126.

iii. Use Device Identifier to Determine Relative Priority of the WCD Compared to a Second WCD with Respect to a Controllable Device As an initial concern, and prior to executing any priority-determination routines or transmitting any priority-related messages, the femtocell 112 may first determine, responsive to receiving the registration request and device identifier from the WCD 101, whether a user associated with the WCD 101 desires to control any locally available controllable devices 116, 118.

As part of the process of determining whether the user desires to control any locally available controllable device 116, 118, the femtocell 112 may first obtain authorization from the WCD 101 to proceed with priority determination. Authorization to proceed may be granted in the initial registration request sent by the WCD 101. Alternatively, a separate authorization process may be initiated at the WCD 101 by the femtocell 112 sending a message to the WCD 101 on a forward channel over the femtocell's 112 carrier instructing the WCD 101 to request authorization from a user of the WCD 101 to proceed with the priority determination. The WCD 101 may then request authorization from the user via its user interface 200.

The request may take the form of, for example, a dialog box including a request for authorization to proceed with priority determination and including a graphical-user-interface (GUI) option to the user to either provide the authorization or deny the authorization. The request for authorization may take any one of several forms, including, for example, a message asking "Do you wish to use this WCD to control any local electronic devices?" The WCD 101 may then provide the user's response to the femtocell 112 in a message transmitted via a reverse channel over the femtocell's 112 carrier. The femtocell 112 may condition further priority determination actions upon receipt of the message providing authorization.

Assuming no authorization process is implemented, or that an authorization process is implemented and authorization has been granted (and any necessary access parameters provided), the femtocell 112 may proceed to execute steps including (i) obtaining priority information, (ii) determining whether a change in priority is required, and (iii) transmitting a message to one or more of the WCDs 101-103 and/or one or more of the controllable devices 116, 118 reflecting the change in priority.

A. Obtaining Priority Information from Priority Data Store

At step 406, the femtocell 112 obtains priority information for each supported controllable device 116, 118 of which it is aware. A data store of priority information may be stored at the femtocell 112 and/or at an external data store 134. If stored at the femtocell 112, the priority data store may be stored in a local volatile or non-volatile memory of the femtocell 112, including for example, the femtocell data storage element 310.

If stored remotely, the femtocell 112 may retrieve priority information from a remotely located external data store 134. The femtocell 112 may retrieve the information from the remote data store 134 via a file transfer connection. The file transfer connection between the femtocell 112 and the remote data store 134 may be based on the file transfer protocol (FTP), the Hypertext Transfer Protocol (HTTP), or any other known or future developed file transfer protocol.

TABLE 1

Example WCD Priority Data Store Structure

| Controllable Device ID | General Relative Priorities |
|---|---|
| 116: Master Bedroom TV | 101. Mom's Phone: 3125551212 |
|  | 102. Dad's Phone: 3125558989 |
|  | 103. Son's Phone: 3125554444 |
| 118: Video Game System | 103. Son's Phone: E8123DDA |
|  | 102. Dad's Phone: 1E8A5C9D |
|  | 101. Mom's Phone: 9D8A3C2F |

Table 1 sets forth an example data structure for the priority data stored in the data store. While Table 1 shows only two controllable devices and three WCDs, the disclosed method and apparatus is equally applicable to any number of controllable devices and WCDs. Furthermore, while the controllable-device-ID reference characters in Table 1 have been chosen to correspond to the reference characters in FIG. 1 for ease of reference and understanding, it should be understood that any combination of alphanumeric characters could be used as a controllable device ID, as long as the ID uniquely identifies a controllable device or group of controllable devices.

The data shown in Table 1 may have been previously set by a user associated with one of the WCDs included in the data structure. The femtocell 112 may, for example, provide an interface to allow a user to set the relative priorities included in Table 1 via their respective WCD or via a separate computing device in the LAN 110. Alternatively, the priorities set forth in Table 1 may be set by a source external to the femtocell 112, and obtained by the femtocell via a file transfer operation. It is also possible that controllable devices are configured to automatically register with the femtocell 112 over the LAN 110 and auto-populate the priority data store with their corresponding controllable device ID.

As shown in Table 1, controllable device 116 may be associated with a Master Bedroom TV. And controllable device 118 may be associated with a Video Game System. Each controllable device 116, 118 is further associated with an ordered, prioritized list of WCDs 101-103. In the case of the Master Bedroom TV 116, each of the WCDs 101-103 is associated with a mobile identification number (MIN) acting as a device identifier. For example, Mom's Phone has a MIN of 3125551212. In the case of the Video Game System 118, each of the WCDs 101-103 is associated with an electronic serial number (ESN) acting as a device identifier. For example, Dad's Phone has a ESN of 1E8A5C9D. Of course, other device identifiers could also be used. Furthermore, while Table 1 utilizes varying device identifier types (ESN and MIN), a single device identifier type may be used throughout the priority data store structure in order to maintain consistency.

In the case of the Master Bedroom TV controllable device 116, the priority data store structure discloses that Mom's Phone 101 has the highest priority, Dad's Phone 102 has the second highest priority, and Son's Phone 103 has the lowest priority. For the Video Game System 118, Son's Phone 103 has the highest priority, Dad's Phone has the second highest priority, and Mom's Phone has the lowest priority. Of course, other methods of indicating relative priorities in the priority data store structure could also be used, such as including an identifier in each line of the priority data store structure explicitly listing each device's relative priority.

Once the femtocell 112 obtains priority information for each supported controllable device 116, 118 of which it is aware, the femtocell 112 may determine whether any change in priority is required for each of the controllable devices 116, 118, as a result of the registration of the new WCD.

B. Determining Whether a Change in Priority is Required

In order to determine whether a change in priority is required for each of the controllable devices 116, 118, the femtocell must first determine who the current highest-priority already-registered WCD is, and second determine whether the new WCD takes priority over the highest-priority already-registered WCD. In one embodiment, the femtocell 112 may track, for each controllable device 116, 118, the WCDs that are already-registered and/or the already-registered WCD that has the highest priority.

TABLE 2

Example WCD Priority Data Store Structure with Tracking

| Controllable Device ID | General Relative Priorities (Ordered) | Highest-priority Already-Registered Device |
|---|---|---|
| 116: Master Bedroom TV | 101. Mom's Phone: 3125551212<br>102. Dad's Phone: 3125558989<br>103. Son's Phone: 3125554444 | 102. Dad's Phone: 3125558989 |
| 118: Video Game System | 103. Son's Phone: E8123DDA<br>102. Dad's Phone: 1E8A5C9D<br>101. Mom's Phone: 9D8A3C2F | 103. Son's Phone: E8123DDA |

TABLE 3

Example WCD Priority Data Store Structure with Tracking

| Controllable Device ID | General Relative Priorities (Ordered) | Already-Registered Devices (Ordered) |
|---|---|---|
| 116: Master Bedroom TV | 101. Mom's Phone: 3125551212<br>102. Dad's Phone: 3125558989<br>103. Son's Phone: 3125554444 | 102. Dad's Phone: 3125558989<br>103. Son's Phone: 3125554444 |
| 118: Video Game System | 103. Son's Phone: E8123DDA<br>102. Dad's Phone: 1E8A5C9D<br>101. Mom's Phone: 9D8A3C2F | 103. Son's Phone: E8123DDA<br>102. Dad's Phone: 1E8A5C9D |

Tables 2 and 3 set forth example data structures that a femtocell 112 may use to track active WCDs with respect to each controllable device 116, 118. While Tables 2 and 3 are directed to an embodiment in which tracking information is stored integrally with the priority tables of Table 1, other structures and methods could also be used. For example, the femtocell 112 may alternatively or additionally store tracking information in a separate data structure, in a separate storage structure, or even at some other device within the LAN 110 or accessible via the WAN 106. Furthermore, while Tables 2 and 3 show two examples of data structures for tracking active WCDs, other structures could also be used.

As set forth in Table 2, a femtocell 112 may track a highest-priority already-registered device for each controllable device. In the example set forth in Table 2, the highest-priority already-registered device for the Master Bedroom TV controllable device 116 is Dad's Phone 102 with a MIN of 3125558989. Alternatively, the highest-priority already-registered device for the Video Game System controllable device 118 is Son's Phone 103 with a ESN of E8123DDA.

In the Example of Table 2, responsive to a registration of Mom's Phone 101 with femtocell 112 as a new WCD, the femtocell 112 may retrieve the priority data for controllable devices 116 and 118 from Table 2 and determine whether the registration would cause any change in priority for controllable devices 116 and 118. For example, in accordance with the General Relative Priorities list of Table 2, Mom's Phone 101 takes priority over the highest-priority already-registered Dad's Phone 102 with respect to the Master Bedroom TV controllable device 116. Accordingly, the registration of Mom's Phone 101 as a new WCD may cause femtocell 112 to determine that a change in priority is required for the Master Bedroom TV controllable device 116.

In contrast, Mom's Phone 101 does not take priority over the highest-priority already-registered Son's Phone 103 with respect to the Video Game System controllable device 118. Accordingly, the registration of Mom's Phone 101 as a new WCD may cause femtocell 112 to determine that a change in priority is not required for the Video Game System controllable device 118.

As set forth in Table 3, a femtocell 112 may alternatively maintain an ordered list of currently active already-registered devices for each controllable device. In the example set forth in Table 3, the highest-priority already-registered device for the Master Bedroom TV controllable device 116 is Dad's Phone 102 with a MIN of 3125558989, followed by Son's Phone 103 with a MIN of 3125554444. Mom's Phone 101 is not currently active. Alternatively, the highest-priority already-registered device for the Video Game System controllable device 118 is Son's Phone 103 with a ESN of E8123DDA followed by Dad's Phone 102 with a ESN of 1E8A5C9D. Mom's Phone 101 is not currently active.

In the Example of Table 3, responsive to a registration of Mom's Phone 101 with femtocell 112 as a new WCD, the femtocell 112 may retrieve the priority data for controllable devices 116 and 118 from Table 2 and determine whether the registration would cause any change in priority for controllable devices 116 and 118. For example, in accordance with the General Relative Priorities list of Table 2, Mom's Phone 101 takes priority over the highest-priority already-registered Dad's Phone 102 with respect to the Master Bedroom TV controllable device 116. Accordingly, the registration of Mom's Phone 101 as a new WCD may cause femtocell 112 to determine that a change in priority is required for the Master Bedroom TV controllable device 116.

In contrast, Mom's Phone 101 does not take priority over the highest-priority already-registered Son's Phone 103 with respect to the Video Game System controllable device 118. Accordingly, the registration of Mom's Phone 101 as a new WCD may cause femtocell 112 to determine that a change in priority is not required for the Video Game System controllable device 118. However, in the embodiment of Table 3 in which an ordered list of all already-registered devices for each controllable device is maintained, femtocell 112 may alternatively trigger a "change in priority" in order to transmit an updated ordered list of already-registered devices to Video Game System controllable device 118 and/or Mom's Phone 101 despite the fact that Mom's Phone 101 does not take priority over the highest-priority already-registered device Son's Phone 103. The ordered list of already-registered devices could be used by the recipient device to perform additional functions or provide additional information to a user.

Once the femtocell 112 determines that a change in priority is required for any one or more controllable devices, processing may proceed to step 408.

iv. Transmit Message to New WCD, Already-Registered WCD, or Controllable Device Reflecting the Determined Priority At step 408, the femtocell 112 transmits at least one message to at least one of (i) the new WCD, (ii) one or more of the already-registered WCDs, and (iii) a controllable device 116, 118, the at least one message reflecting the determined at least one relative priority from step 406.

The destination of the message transmitted by the femtocell 112 may depend upon the capabilities of each of the devices noted above, and upon which of several possible network structures are implemented in a particular embodiment. While each of the destinations is separately set forth below, it should be understood that any combination of messages could be transmitted to any combination of destination devices as a result of the priority determination in step 406. Furthermore, the femtocell 112 may transmit messages to other devices responsive to the priority determination of step 406 without departing from the scope of this disclosure.

A. Transmit Message to New WCD

In a first embodiment, the femtocell 112 may transmit a message to the new WCD in step 408. The message may reflect to the new WCD that it is now the highest-priority device relative to at least one controllable device, and may provide the new WCD with an identifier of the at least one controllable device. Alternatively, the message may reflect to the new WCD that it is not the highest-priority device relative to any controllable devices.

For example, assuming the priority data store structure of Table 2 is again stored in the femtocell 112, responsive to the registration of Mom's Phone 101 as a new WCD, the femtocell 112 may determine in step 406 that Mom's Phone 101 takes priority over the highest-priority already-registered device Dad's Phone 102. In response, femtocell 112 may transmit a message to Mom's Phone 101 reflecting that Mom's Phone 101 is now the highest-priority device relative to the Master Bedroom TV controllable device 116. The message may include an identifier that uniquely identifies the Master Bedroom TV controllable device 116 to Mom's Phone 101. The identifier may be, for example, a serial number, model number, MAC address, Security Key, IR protocol, or IR command set associated with the Master Bedroom TV controllable device 116. Of course, other identifiers could also be used.

Responsive to receiving the message, Mom's Phone 101 may then be configured to allow a user to control the Master Bedroom TV controllable device 116 to the exclusion of other already-registered devices, such as Dad's Phone 102. An indication may be made to the user interface 200 of Mom's Phone 101 that it is now the highest-priority device for controlling the Master Bedroom TV controllable device 116, may ask the user if he or she wishes to control the controllable device 116, may provide an indication that controllable devices are present within the area, or may automatically provide an interface to available control commands that may be sent to the Master Bedroom TV controllable device 116. Mom's Phone 101 may be configured to execute other functions as well.

Mom's Phone 101 may then be configured to send control commands directly to the Master Bedroom TV controllable device 116 via an Infrared or Bluetooth connection, for example, or may be configured to send control commands to the Master Bedroom TV controllable device 116 via the femtocell 112. In the latter case, the femtocell 112 may then forward the commands received from Mom's Phone 101 to the Master Bedroom TV controllable device 116, perhaps after verifying that Mom's Phone 101 is still the highest-priority device relative to Master Bedroom TV controllable device 116. In the event that the femtocell 112 determines that Mom's Phone 101 is no longer the highest-priority device relative to Master Bedroom TV controllable device 116, it may refrain from forwarding the commands received from Mom's Phone 101 to the Master Bedroom TV controllable device 116 and/or may send an indication to Mom's Phone 101 reflecting that Mom's Phone 101 is no longer the highest-priority device relative to Master Bedroom TV controllable device 116.

Because the registration of Mom's Phone 101 does not impact the priority structure of Table 2 relative to the Video Game System controllable device 118, the femtocell 112 may refrain from transmitting any message to Mom's Phone 101 regarding the Video Game System controllable device 118, or the femtocell 112 may alternatively transmit a message to Mom's Phone 101 explicitly informing Mom's Phone 101 that it is not the highest-priority device relative to Video Game System controllable device 118. The message may further reflect what device is currently the highest-priority already-registered device relative to Video Game System controllable device 118, which in this case, would reflect Son's Phone 103. Providing this information may aid users in making future edits to the priority data store structure.

In the event that the femtocell 112 alternatively maintains a priority data store structure as set forth in Table 3, the femtocell 112 may transmit messages to the new WCD similar to the transmissions discussed above relative to Table 2. However, in this instance, the femtocell 112 may additionally trigger a "change in priority" and transmit a message to the new WCD Mom's Phone 101 indicating the ordered list of priority relative to Video Game System controllable device 118 despite the fact that Mom's Phone 101 does not take priority over the highest-priority already-registered device Son's Phone 103. By transmitting this priority data to Mom's Phone 101, Mom's Phone 101 may disclose the relative priorities of already-registered devices to a user via its user interface 200.

B. Transmit Message to Already-Registered WCD

In a second embodiment, the femtocell 112 may transmit a message to the one or more of the already-registered devices in step 408. For example, the femtocell 112 may transmit a message to the previous highest-priority already-registered device reflecting that the device is no longer the highest-priority device relative to at least one controllable device, and may provide the previously highest-priority already-registered device with an identifier of the new WCD that has become the new highest-priority device relative to the at least one controllable device.

For example, assuming the priority data store structure of Table 2 is again stored in the femtocell 112, responsive to the registration of Mom's Phone 101 as a new WCD, the femtocell 112 may determine in step 406 that Mom's Phone 101 takes priority over the highest-priority already-registered device Dad's Phone 102. In response, femtocell 112 may transmit a message to Dad's Phone 102 revoking its status as the highest-priority device relative to Master Bedroom TV controllable device 116. The message may reflect that Mom's Phone 101 has taken priority over Dad's Phone 102.

In this embodiment, the femtocell 112 may also transmit a message to Mom's Phone 101 reflecting that it is now the highest-priority device relative to Master Bedroom TV controllable device 116. However, the transmission of a message to Mom's Phone 101 may not be necessary in certain embodiments, such as when a new WCD is configured to assume it has priority over all other devices until it is informed otherwise by the femtocell 112.

Furthermore, in an embodiment where the highest-priority already-registered WCD is configured to automatically revoke its own status as the highest-priority controlling device once a pre-determined amount of time has passed without receiving an updated indication of its status from the femtocell 112, the transmission of a message to the already-registered WCD may not be necessary. In the example of Table 2, Dad's Phone 102 may be configured to automatically revoke its status as the highest-priority controlling device after a predetermined amount of time has passed without receiving on updated indication of its status from femtocell 112. After the time-based revocation, Dad's Phone 102 may prevent a user from controlling the Master Bedroom TV controllable device 116, or perhaps assume a lower-priority status relative to the Master Bedroom TV controllable device 116.

In the event that the femtocell 112 alternatively maintains a priority data store structure as set forth in Table 3, the femtocell 112 may transmit messages to an already-registered WCD similar to the transmissions discussed above relative to Table 2. However, in this instance, the femtocell 112 may additionally trigger a "change in priority" and transmit a message to the already-registered WCDs (Dad's Phone 102 and Son's Phone 103) indicating the new ordered list of priority relative to each controllable device (Master Bedroom TV controllable device 116 and Video Game System controllable device 118). By transmitting this priority data to the already-registered WCDs (Dad's Phone 102 and Son's Phone 103), Dad's Phone 102 and Son's Phone 103 may disclose the new list of relative priorities to a user via each respective WCD's user interface 200.

C. Transmit Message to Controllable Device

In a third embodiment, the femtocell 112 may transmit a message to the controllable device in step 408. The message may reflect that the new WCD is now the highest-priority device, or may reflect a new hierarchical structure of priority that includes the new WCD. Other message structures are also possible.

For example, assuming the priority data store structure of Table 2 is again stored in the femtocell 112, responsive to the registration of Mom's Phone 101 as a new WCD, the femtocell 112 may determine in step 406 that Mom's Phone 101 takes priority over the highest-priority already-registered device Dad's Phone 102. In response, femtocell 112 may transmit a message to the Master Bedroom TV controllable device 116 reflecting that Mom's Phone 101 is now the highest-priority device. Alternatively, the message may include a new hierarchical list of priorities in which Mom's Phone 101 is newly listed as the highest-priority registered device. The Master Bedroom TV controllable device 116 may then use this information in determining what control commands to execute for what WCDs.

In the event that control commands are received at the Master Bedroom TV controllable device 116 from Mom's Phone 101 indirectly via the femtocell 112, the Master Bedroom TV controllable device 116 may avoid having to execute a comparison of device identifiers but instead may rely upon the femtocell 112 to filter out control commands from lower-priority devices.

In the event that control commands are received at the Master Bedroom TV controllable device 116 directly from Mom's Phone 101, and in order for the Master Bedroom TV controllable device 116 to recognize Mom's Phone 101 as a new highest-priority device, the Master Bedroom TV controllable device 116 may compare a device identifier received from the femtocell 112 with a device identifier received directly from Mom's Phone 101. If the device identifiers match, the Master Bedroom TV controllable device 116 may execute the command(s) sent from Mom's Phone. If the device identifiers do not match (i.e., they are sent from Dad's Phone 102), the Master Bedroom TV controllable device 116 may simply ignore the commands or may provide an indication to Dad's Phone 102 that it is not currently the highest-priority controlling device. The indication may be provided directly from the Master Bedroom TV controllable device 116 to Dad's Phone 102 via a same or different short-range wireless connection used to transmit the commands.

Furthermore, the Master Bedroom TV controllable device 116 may apply the priority determination for all the commands that it supports, or may apply the priority determination on a command-by-command basis such that Mom's Phone 101 may have priority for some functions, while Dad's Phone 102 may have priority for other functions, or such that some commands (such as volume) are executed by the Master Bedroom TV controllable device 116 regardless of priority while other commands are executed only if received from Mom's Phone 101. Alternatively or additionally, the Master Bedroom TV controllable device 116 may allow Mom's Phone 101 to change channels to an age-restricted (or content-restricted) channel, but prevent Son's Phone 103 from changing channels to a similar age-restricted (or content-restricted) channel. The information regarding which channels are accessible by which WCDs may be stored in the Master Bedroom TV controllable device 116 itself, or may be stored in the same data store that the priority data is stored in, for example.

In the case of the Video Game System controllable device 118 of Table 2, and responsive to the registration of Mom's Phone 101 as a new WCD, the femtocell 112 may simply refrain from transmitting a message to the Video Game System controllable device 118 as the registration of Mom's Phone 101 does not affect the status of Son's Phone 103 as the highest-priority already-registered device.

In the event that the femtocell 112 alternatively maintains a priority data store structure as set forth in Table 3, the femtocell 112 may transmit a message to a controllable device similar to the transmissions discussed above with respect to Table 2. However, in this instance, femtocell 112 may transmit a message to Video Game System controllable device 118 including a new hierarchical priority list of registered devices that includes Mom's Phone 101, even though Mom's Phone 101 is not the highest priority device. The Video Game System controllable device 118 may then utilize this information in determining what commands it receives directly from WCDs to execute.

In either example above, femtocell 112 may further transmit one or more additional messages to the WCDs 101, 102, or 103. The additional messages may, for example, reflect the information sent to the controllable devices 116, 118 and allow the receiving WCD to provide an indication to a user regarding its status as a controlling device relative to one or more controllable devices 116, 118. For example, in the case of the Master Bedroom TV controllable device 116 of Table 2, and responsive to the registration of Mom's Phone 101 as a new WCD, femtocell 112 may, in addition to transmitting a message to Master Bedroom TV controllable device 116, may also transmit a message to Mom's Phone 101 reflecting its new status as the highest-priority controlling device relative to the Master Bedroom TV controllable device 116.

v. Detect an Absence or De-Registration of an Already-Registered WCD and Determine Whether Changes in Priority are Required At optional step 410, the femtocell 112 may detect an absence or de-registration of an already-registered WCD and determine whether a change in priorities is required. As part of the communication standard for CDMA and many other wireless communication protocols, a new WCD may be informed of a re-registration period by the femtocell 112 when the WCD registers with the femtocell 112 for service. The re-registration interval specifies a time period in which the WCD must transmit a re-registration request to the femtocell 112. Failure to transmit the re-registration request within the specified re-registration interval may result in the femtocell 112 discontinuing service to the WCD. Accordingly, the femtocell 112 may include a timer to track a re-registration interval for each WCD it serves. If a timer expires without the femtocell 112 receiving a re-registration request, the femtocell 112 may assume that the corresponding WCD has powered down or left the area, and determine that the WCD is absent. The femtocell 112 may then discontinue service to the WCD.

Of course, the WCD could also proactively indicate to the femtocell 112 that it is either discontinuing service (e.g., powering down), or that it is handing off service to another provider (e.g., the macro network) by actively de-registering with the femtocell 112.

After detecting the absence or de-registration of the WCD, either through expiration of the re-registration interval, receipt of a proactive indication from the WCD, or in some other manner, the femtocell 112 may determine whether a change in priorities is required for each of one or more controllable devices. If a change is required, the femtocell 112 may transmit an update message to at least one of (i) an already-registered wireless communication device and (ii) a controllable device, the update message reflecting the determined at least one relative priority.

For example, assuming the priority data store structure of Table 2 is again stored in the femtocell 112, responsive to the femtocell detecting an absence or de-registration of Dad's Phone 102, the femtocell 112 may determine that a change in priority is required for the Master Bedroom TV controllable device 116. The femtocell 112 may then transmit a message to at least one of (i) Son's Phone 103 and (2) Master Bedroom TV controllable device 116 reflecting that Son's Phone 103 has become the highest-priority device relative to the Master Bedroom TV controllable device 116. Because the de-registration or absence of Dad's Phone 102 does not affect the highest priority device relative to the Video Game System controllable device 118, femtocell 112 may simply refrain from transmitting a message to Son's Phone 103 or Video Game System controllable device 118 regarding the de-registration or absence of Dad's Phone 102. Alternatively, and perhaps in the event that a priority data store structure similar to that of Table 3 is maintained at the femtocell 112, the femtocell 112 may transmit a message to Video Game System controllable device 118 and/or Son's Phone 103 setting forth a new priority hierarchy that does not include Dad's Phone 102. Other possibilities exist as well.

3. Conclusion

In accordance with the foregoing embodiments, priorities among multiple WCDs each capable of controlling one or more controllable devices may be seamlessly managed by a femtocell. As a result, conflicts among multiple controlling WCDs may be avoided by prioritizing WCDs relative to respective controllable devices.

Various exemplary embodiments have been described above. Those skilled in the art will understand, however, that changes and modifications may be made to those examples without departing from the scope of the claims.

The invention claimed is:

1. A method for a femtocell to manage wireless communication device control of at least one controllable device, the method comprising:
   a femtocell receiving a registration request with a device identifier from a first wireless communication device;
   responsive to receiving the registration request, the femtocell (i) providing the first wireless communication device with wireless service and (ii) using the device identifier to determine a relative priority of the first wireless communication device, as compared with a second wireless communication device, for controlling the controllable device; and
   the femtocell transmitting at least one message to at least one device selected from the group consisting of (i) the first wireless communication device, (ii) the second wireless communication device, and (iii) the controllable device in accordance with the determination, the at least one message indicating the determined relative priority.

2. The method of claim 1, wherein transmitting the at least one message comprises transmitting a first message to the first wireless communication device, the first message indicating that the first wireless communication device has a highest-priority for controlling the controllable device.

3. The method of claim 2, wherein transmitting the at least one message further comprises transmitting a second message to the second wireless communication device, the second message indicating that the second wireless communication device no longer has the highest-priority for controlling the controllable device.

4. The method of claim 1, wherein transmitting the at least one message comprises transmitting a first message to the controllable device, the first message indicating that the first wireless communication device has a highest-priority for controlling the controllable device.

5. The method of claim 1, wherein the relative priority is a first relative priority and the controllable device is a first controllable device, the method further comprising:
 responsive to receiving the registration request, using the device identifier to determine a second relative priority of the first wireless communication device, as compared to the second wireless communication device, for controlling a second controllable device; and
 transmitting to at least the second controllable device an indication of the determined second relative priority.

6. The method of claim 1, wherein using the device identifier to determine the relative priority comprises accessing a data store that maintains relative priorities of wireless communication devices and determining the relative priority from the data store, wherein the data store is located at the femtocell.

7. The method of claim 1, wherein using the device identifier to determine the relative priority comprises accessing a data store that sets forth relative priorities of wireless communication devices, wherein the data store is located remote from the femtocell, and wherein accessing the data store comprises transmitting a request to the data store to retrieve at least the relative priority.

8. The method of claim 1, wherein the device identifier comprises at least one of an electronic serial number (ESN) and a mobile identification number (MIN).

9. The method of claim 1, further comprising the femtocell (i) receiving from the first wireless communication device a control command for the first wireless communication device to control the controllable device, (ii) responsive to receipt of the control command, determining whether the first wireless communication device has a highest-priority for controlling the controllable device, and (iii) responsive to determining that the first wireless communication device has the highest-priority, transmitting the received control command to the controllable device.

10. The method of claim 1, further comprising the femtocell (i) receiving from the first wireless communication device a control command for controlling the controllable device, (ii) responsive to receipt of the control command, determining whether the first wireless communication device has a highest-priority for controlling the controllable device, and (iii) responsive to determining that the first wireless communication device does not have the highest-priority, refraining from transmitting the control command to the controllable device.

11. The method of claim 1, further comprising the femtocell determining that the first wireless communication device is no longer registered, and responsively:
 determining a relative priority of at least one still-registered wireless communication device for controlling the controllable device; and
 transmitting an update message to at least one device selected from the group consisting of (i) the at least one still-registered wireless communication device and (ii) the controllable device, the update message indicating the determined relative priority of the at least one still-registered wireless communication device for controlling the controllable device.

12. A femtocell arranged to manage wireless communication device control of at least one controllable device, the femtocell comprising:
 a communication interface;
 a processor; and
 data storage containing instructions executable by the processor for causing the femtocell to carry out steps including:
  receiving a registration request with a device identifier from a first wireless communication device;
  responsive to receiving the registration request, (i) providing the first wireless communication device with wireless service and (ii) using the device identifier to determine a relative priority of the first wireless communication device, as compared with a second wireless communication device, for controlling the controllable device; and
 transmitting at least one message to at least one device selected from the group consisting of (i) the first wireless communication device, (ii) the second wireless communication device, and (iii) the controllable device in accordance with the determination, the at least one message indicating the determined relative priority.

13. The femtocell of claim 12, wherein transmitting the at least one message comprises transmitting a first message to the first wireless communication device, the first message indicating that the first wireless communication device has a highest-priority for controlling the at least one controllable device.

14. The femtocell of claim 13, wherein transmitting the at least one message further comprises transmitting a second message to the second wireless communication device, the second message indicating that the second wireless communication device no longer has the highest-priority for controlling the at least one controllable device.

15. The femtocell of claim 12, wherein transmitting the at least one message comprises transmitting a first message to the controllable device, the first message indicating that the first wireless communication device has a highest-priority for controlling the controllable device.

16. The femtocell of claim 12, wherein the relative priority is a first relative priority and the controllable device is a first controllable device, and wherein the steps further comprise:
 responsive to receiving the registration request, using the device identifier to determine a second relative priority of the first wireless communication device, as compared to the second wireless communication device, for controlling a second controllable device; and
 transmitting to at least the second controllable device an indication of the determined second relative priority.

17. The femtocell of claim 12, wherein using the device identifier to determine the relative priority comprises accessing a data store that maintains relative priorities of wireless communication devices and determining the relative priority from the data store, wherein the data store is located at the femtocell.

18. The femtocell of claim 12, wherein using the device identifier to determine the relative priority comprises accessing a data store that sets forth relative priorities of wireless communication devices, wherein the data store is located remote from the femtocell, and wherein accessing the data store comprises transmitting a request to the data store to retrieve at least the relative priority.

19. The femtocell of claim 12, wherein the device identifier comprises at least one of an electronic serial number (ESN) and a mobile identification number (MIN).

20. The femtocell of claim 12, wherein the steps further comprise (i) receiving from the first wireless communication device a control command for the first wireless communication device to control the controllable device, (ii) responsive to receipt of the control command, determining whether the first wireless communication device has a highest-priority for controlling the controllable device, and (iii) responsive to determining that the first wireless communication device has the highest-priority, transmitting the received control command to the controllable device.

21. The femtocell of claim 12, wherein the steps further comprise (i) receiving from the first wireless communication device a control command for the first wireless communication device to control the controllable device, (ii) responsive to receipt of the control command, determining whether the first wireless communication device has a highest-priority for controlling the controllable device, and (iii) responsive to determining that the first wireless communication device does not have the highest-priority, refraining from transmitting the control command to the controllable device.

22. The femtocell of claim 12, wherein the steps further comprise determining that the first wireless communication device is no longer registered, and responsively:
 determining a relative priority of at least one still-registered wireless communication device for controlling the controllable device; and
 transmitting an update message to at least one of device selected from the group consisting of (i) the at least one still-registered wireless communication device and (ii) the controllable device, the update message indicating the determined relative priority of the at least one still-registered wireless communication device for controlling the controllable device.

* * * * *